(12) United States Patent
Cadeddu

(10) Patent No.: US 11,951,954 B2
(45) Date of Patent: Apr. 9, 2024

(54) BOOSTED HYDRAULIC BRAKING DEVICE

(71) Applicant: VHIT S.p.A. Societa Unipersonale, Offanengo (IT)

(72) Inventor: Leonardo Cadeddu, Crema (IT)

(73) Assignee: VHIT S.P.A. SOCIETÀ UNIPERSONALE, Offanengo (IT)

( * ) Notice: Subject to any disclaimer, the term of this patent is extended or adjusted under 35 U.S.C. 154(b) by 80 days.

(21) Appl. No.: 16/620,564

(22) PCT Filed: Jun. 5, 2018

(86) PCT No.: PCT/EP2018/064702
§ 371 (c)(1),
(2) Date: Dec. 9, 2019

(87) PCT Pub. No.: WO2018/228856
PCT Pub. Date: Dec. 20, 2018

(65) Prior Publication Data
US 2020/0198608 A1    Jun. 25, 2020

(30) Foreign Application Priority Data
Jun. 14, 2017   (IT) .................. 102017000066182

(51) Int. Cl.
*B60T 13/14* (2006.01)
*B60T 11/16* (2006.01)

(52) U.S. Cl.
CPC ........... *B60T 13/145* (2013.01); *B60T 11/165* (2013.01)

(58) Field of Classification Search
CPC .... B60T 13/142; B60T 13/143; B60T 13/144; B60T 13/145; B60T 13/146; B60T 13/147; B60T 11/18
(Continued)

(56) References Cited

U.S. PATENT DOCUMENTS

| 4,433,543 A * | 2/1984 | Thomas ................ B60T 13/143 60/547.1 |
| 10,434,999 B2 * | 10/2019 | Cadeddu ............... B60T 11/203 |

(Continued)

FOREIGN PATENT DOCUMENTS

| EP | 1457400 A1 | 9/2004 |
| EP | 1538047 A2 | 6/2005 |

(Continued)

OTHER PUBLICATIONS

International Search Report for PCT/EP2018/064702, dated Sep. 12, 2018.

*Primary Examiner* — Kenneth Bomberg
*Assistant Examiner* — Michael Quandt
(74) *Attorney, Agent, or Firm* — NORTON ROSE FULBRIGHT US LLP; Gerard A. Messina

(57) ABSTRACT

A hydraulic braking device comprising a master cylinder and a brake booster. The braking device comprises a control piston driven by actuating a brake pedal and mounted so as to be tightly slidable in a plunger of a piston of the brake booster. The control piston comprises a first end portion having a certain cross-sectional area and being arranged to cooperate with a gasket so as to establish, during braking, a modulated communication between the first chamber of the brake booster and a discharge chamber of the master cylinder. The braking device has an effective cross-sectional area counter-acting a pressure existing in a region comprised between a master cylinder piston and the control piston. Such area is different from the cross-sectional area of the first end portion of the control piston.

2 Claims, 4 Drawing Sheets

(58) Field of Classification Search
USPC .............................. 91/373; 60/547.7, 547.1
See application file for complete search history.

(56) References Cited

U.S. PATENT DOCUMENTS

| | | | | |
|---|---|---|---|---|
| 2004/0212248 | A1* | 10/2004 | Cadeddu | ............... B60T 13/145 |
| | | | | 303/114.1 |
| 2010/0289324 | A1* | 11/2010 | Cadaddu | ............... B60T 8/4004 |
| | | | | 303/9.61 |
| 2013/0175852 | A1* | 7/2013 | Cadeddu | ................ B60T 17/04 |
| | | | | 303/8 |

FOREIGN PATENT DOCUMENTS

| | | |
|---|---|---|
| EP | 2105365 A2 | 9/2009 |
| GB | 2182407 A | 5/1987 |
| WO | 2009090078 A2 | 7/2009 |
| WO | 2017013595 A1 | 1/2017 |

* cited by examiner

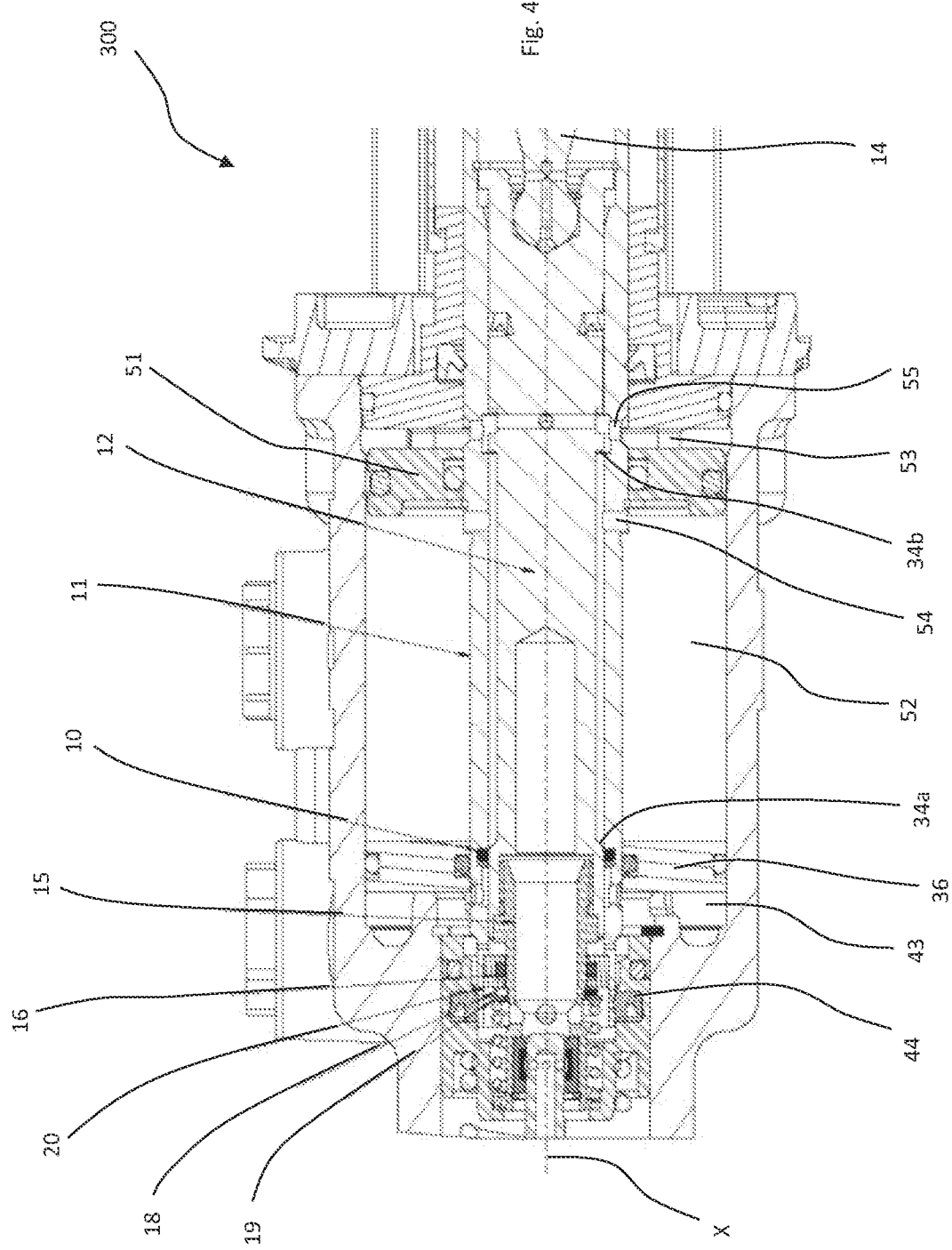

BOOSTED HYDRAULIC BRAKING DEVICE

FIELD

The present invention relates in general to a boosted hydraulic braking device and, more specifically, it relates to a boosted hydraulic braking device equipped with a pressure-balancing device for working machines, such as agricultural tractors, earth-moving machines and the like.

BACKGROUND INFORMATION

The use of hydraulic braking systems comprising one or more master cylinder(s) having a pumping function and actuated by a pedal or corresponding pedals are used within the field of motor vehicles.

Several of these braking systems further comprise boosted hydraulic braking devices, also called brake boosters (or hydroboosters), associated to the master cylinder or to each master cylinder and advantageously provided within the body of the master cylinder.

Examples of braking systems of this type are described, for example, in European Patent Application No. EP 1457400 and PCT Application No. WO 2017/013595.

The braking systems described in the above-cited patent applications provide, in particular, for the presence of a control piston (also called spool) connected to a brake pedal. The control piston is adapted to drive a brake booster allowing to exert a pressure onto a piston of the master cylinder so that this piston generates, within a chamber of the master cylinder, a control pressure adapted to act onto braking members of a vehicle. The brake booster comprises a brake booster piston arranged between a first chamber and a second chamber and integral with a plunger adapted to slide on the control piston. Under rest conditions, the first and the second chambers are connected to each other so that the boosting pressure is identical on both sides of the brake booster piston. During braking, the connection between the first chamber and the second chamber is interrupted and the second chamber is brought into modulated connection with a discharge chamber. In this way the pressure within the second chamber becomes reduced and the pressure difference (delta pressure) between the two chambers exerts onto the brake booster piston a thrust which adds to the thrust exerted by the pedal, thereby making the pedal move towards the chamber of the master cylinder, thus amplifying the force exerted onto the piston of the cylinder and, consequently, the pressure exiting the master cylinder and therefore making braking easier.

Brake boosters are characterized by a parameter called "boosting ratio" $R_{ass}$, defined as the ratio between the boosting force $F_{ass}$, i.e. the force generated by the boosting system, and the incoming force $F_{in}$, i.e. the force exerted by the brake pedal. In the brake boosters described in the above-cited applications, such boosting ratio is $$R_{ass} = \frac{F_{ass}}{F_{in}} = \frac{(A_{MC} - A_{spool})}{A_{spool}}$$

where $A_{MC}$ is the effective cross-sectional area of the master cylinder piston exerting pressure while advancing within the chamber of the master cylinder and $A_{spool}$ is the effective cross-sectional area of the control piston exerting pressure while advancing towards the master cylinder piston.

Brake boosters of the conventional type, though optimally performing their function of boosting braking, have the problem that they cannot be easily and cost-effectively modified when a different boosting ratio is required. Indeed, in such brake boosters, changing the boosting ratio involves either modifying the master cylinder or replacing the control piston with another one having a different cross-sectional area and therefore replacing other components, especially the plunger sliding on the control piston. Both solutions mentioned above are difficult to implement and involve remarkable costs in order to be practiced.

Therefore, there is the need to be able to easily and cost-effectively modify brake boosters in order to obtain a different boosting ratio. Such need is felt especially in the field of agricultural vehicles, for which an increasingly higher optimization and customization of the functional features of the boosted braking system, including the boosting ratio, is required depending on the kind of agricultural vehicle. In addition, the need for adaptation to the evolving regulations concerning agricultural vehicles also contributes to make such need particularly felt.

SUMMARY

An object of the present invention is to overcome the drawbacks and limitations of the conventional systems by providing a hydraulic braking system which can be easily and cost-effectively modified in order to vary the boosting ratio of its brake booster.

This object may be achieved by an example hydraulic braking device in accordance with the present invention.

The example hydraulic braking device according to the present invention comprises a master cylinder and a brake booster.

A piston of the brake booster defines a first and a second pressurized chambers of the brake booster, said chambers being associated to communication means arranged to establish, under rest conditions of the braking device, a communication between the first and the second pressurized chambers of the brake booster and to interrupt such communication during braking.

A piston of the master cylinder defines a chamber of the master cylinder, said chamber being arranged to contain a pressurized fluid and a control pressure transmitted to one or more vehicle brakes being generated in said chamber.

The piston of the master cylinder is associated to a control piston which is mounted so as to be tightly slidable in a plunger of the piston of the brake booster and is driven by actuating a brake pedal.

The control piston comprises a first end portion, distal relative to the brake pedal and having a certain cross-sectional area arranged to cooperate with a gasket so as to establish, during braking, a modulated communication between the first chamber of the brake booster and a discharge chamber of the master cylinder.

The braking device has an effective cross-sectional area which is adapted to counter-act a pressure existing in a region comprised between the piston of the master cylinder and the control piston and is different from the cross-sectional area of the first end portion of the control piston.

According to a preferred feature of the present invention, the braking system comprises a bushing fixedly connected to the first end portion of the control piston. The bushing comprises an outer surface arranged to cooperate with a gasket associated with the plunger, so that the effective cross-sectional area counter-acting the pressure existing in the region comprised between the piston of the master cylinder and the control piston is the effective cross-sectional area of the bushing.

According to an alternative feature of the present invention, the control piston comprises a thrust portion. Said thrust portion comprises an outer surface arranged to cooperate with a gasket associated with the plunger, so that the effective cross-sectional area counter-acting the pressure existing in the region comprised between the piston of the master cylinder and the control piston is the effective cross-sectional area of the thrust portion.

By virtue of the fact that the end portion of the control piston distal relative to the brake pedal is connected with a bushing or comprises a thrust portion, and of the fact that a gasket associated to the plunger cooperates with an outer surface of the bushing or of the thrust portion, it is possible to easily vary the boosting ratio of the braking device. Said ratio, indeed, depends on the effective cross-sectional area adapted to counter-act the pressure existing in the region comprised between the piston of the master cylinder and the control piston. As, according to the present invention, said area is the effective cross-sectional area of the bushing or of the thrust portion of the control piston, it is easy to modify the boosting ratio by simply replacing the bushing or the control piston, in addition to the corresponding gasket cooperating with the bushing or with the thrust portion, and any means that may connect said gasket with the plunger, for instance washers or bushings.

BRIEF DESCRIPTION OF THE DRAWINGS

These and other features and advantages of the present invention will become apparent form the following description of preferred embodiments given by way of non-limiting example with reference to the figures, in which elements identified with identical or similar reference numerals denote elements having the same or similar function and construction.

FIG. 4 shows a view of a part of a hydraulic braking device according to a third embodiment of the present invention.

DETAILED DESCRIPTION OF EXAMPLE EMBODIMENTS

Figure 1:
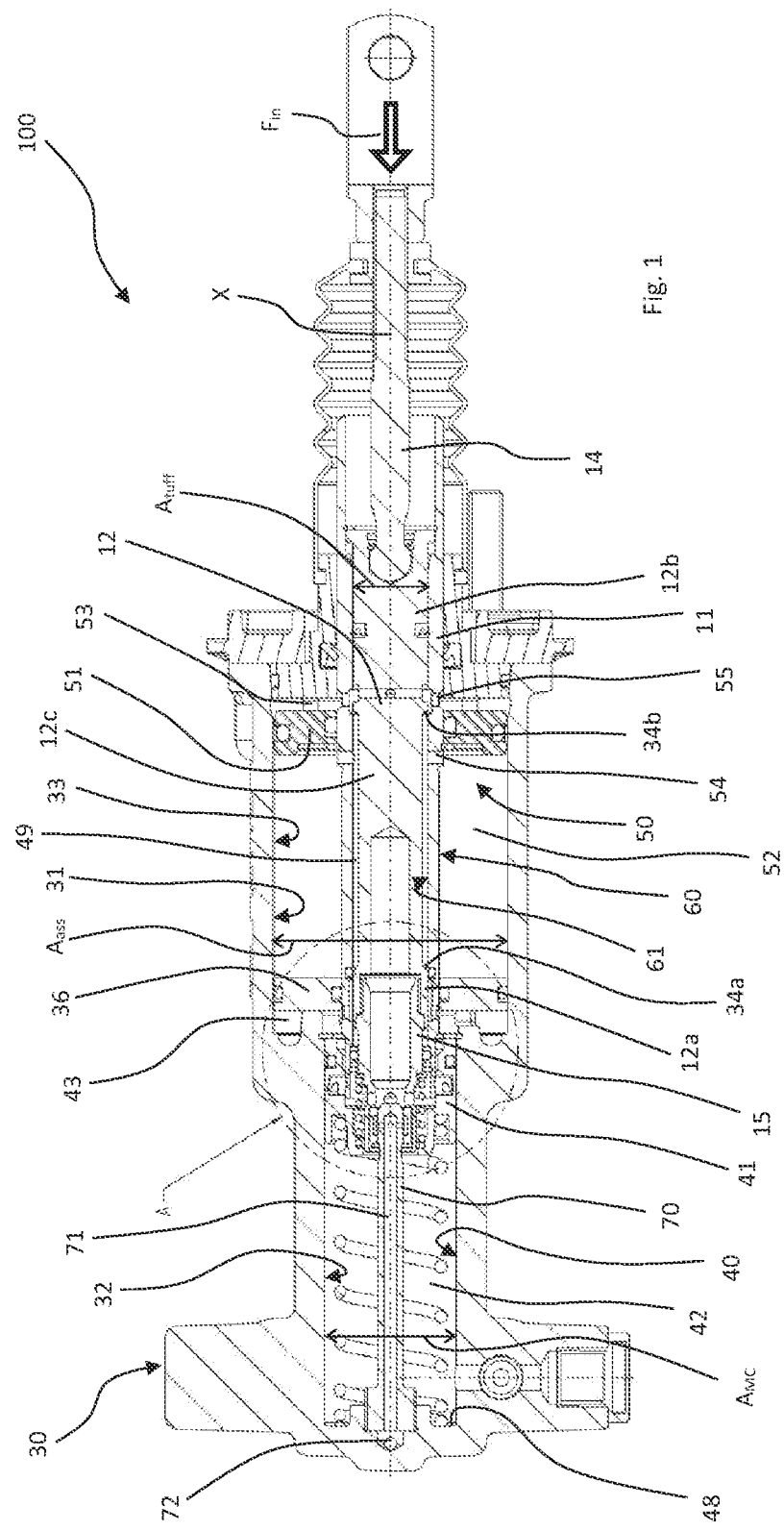
FIG. 1 shows a sectional view of a hydraulic braking device according to a first embodiment of the present invention.
Figure 2:
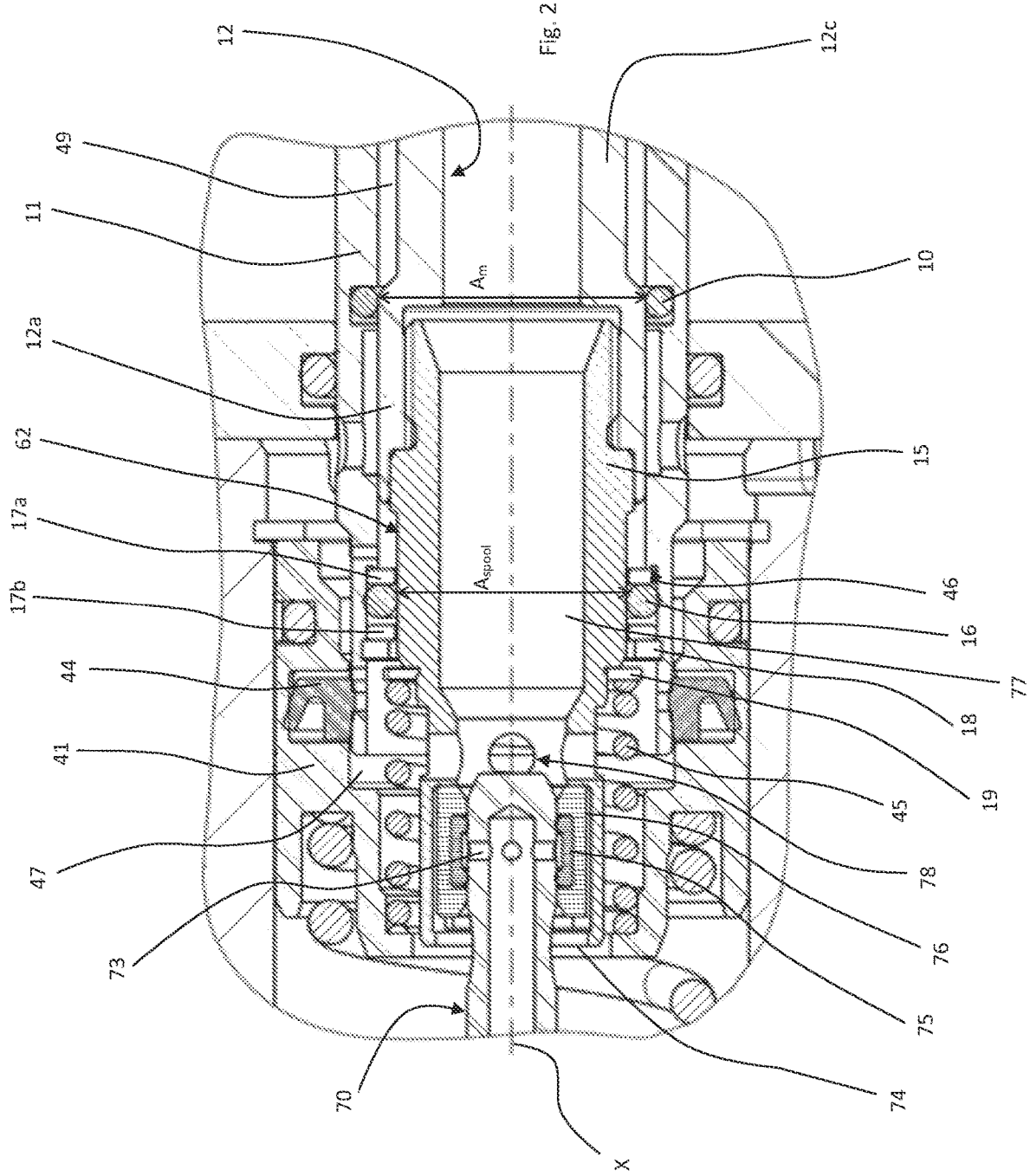
FIG. 2 shows an enlarged view of a detail A of the hydraulic braking device of FIG. 1.

Referring to FIGS. 1 and 2, a hydraulic braking device 100 (braking device) according to a first embodiment of the present invention is shown, being part of braking system of an agricultural vehicle or the like. The general structure of the braking device corresponds to the one described in European Patent Application No. EP 1457400 and PCT Application No. WO 2017/013595, to which reference is made for a detailed description of the structure itself as well as of the operation thereof. Here, the main components of the braking device 100 will be briefly illustrated by focusing on those necessary for understanding the present invention.

In the description, "rear" refers to the right side of the braking system 100 facing towards a brake pedal, and "front" refers to the left side (brake side).

The braking device 100, also called master cylinder-brake booster assembly, comprises a body 30 having an axial hole 31 with a longitudinal axis X, said body housing both the members of the master cylinder 40 and those of the brake booster 50 and being divided by a fixed disk 36 into a front bore 32 with reduced diameter, in which the piston 41 of the master cylinder 40 slides longitudinally, and a rear bore 33 which has a diameter larger than that of the front bore 32 and in which a piston 51 of the brake booster 50 slides longitudinally.

The piston 41 of the master cylinder 40 defines, in the front bore 32, a chamber 42 (chamber of the master cylinder) which is arranged to contain oil at a control pressure depending on the force applied to the piston 41 of the master cylinder 40 by means of a brake pedal (not shown) and communicates with one or more brakes (not shown) of the vehicle.

The piston 51 of the brake booster 50 is associated to a control piston 12 (also called spool) extending through the rear bore 33 of the axial hole 31. The control piston 12 comprises a first (front) end portion 12a and a second (rear) end portion 12b connected to an actuating rod 14 which in turn is connected to the brake pedal. Both end portions 12a, 12b of the control piston 12 preferably have a diameter larger than that of a middle portion 12c thereof, which has a reduced diameter; said middle portion 12c, having regions or steps 34a, 34b for connection to the end portions 12a, 12b with larger diameter, defines a gap 49 between the outer surface 60 of the control piston 12 and the inner surface 61 of a plunger 11 of the piston 51 of the brake booster 50. The plunger 11 slides on the control piston 12 exerting a sealing action against the end portions 12a, 12b thereof.

The piston 51 of the brake booster 50 further defines, within the rear bore 33 of the axial hole 31, a first (front) pressurized chamber 52, and a second (rear) pressurized chamber 53 communicating with a pressurized oil tank (not shown). Passageways 54 and 55 are provided between the chambers 52 and 53 and the gap 49, respectively, said passageways passing through the plunger 11 and, under rest conditions of the device (as shown in FIG. 1), communicate the front chamber 52 with the rear chamber 53 through the gap 49. When the brake pedal is actuated, the control piston 12, moving towards the front region, obstructs the passageway 55, thus isolating the front chamber 52 from the rear chamber 53.

Between the gap 49 and the chamber 42 of the master cylinder 40 there are provided further passageways, formed between the outer surface 60 of the control piston 12 and the inner surface 61 of the plunger 11 and controlled by a suitable gasketing system, adapted to prevent, under rest conditions of the braking device, communication between the front chamber 52 and a discharge chamber 43 of the master cylinder 40 and to communicate the front chamber 52 with the discharge chamber 43 of the master cylinder 40 when the brake pedal is actuated.

This gasketing system includes, among others, a first gasket 10, for example an O-ring, associated to the inner surface 61 of the plunger 11 and adapted to cooperate with the front end portion 12a of the control piston 12, and a second gasket 44, for example a lip-type gasket, arranged between the plunger 11 and the piston 41 of the master cylinder 40.

The cross-sectional area of the front end portion 12a of the control piston 12 with which the gasket 10 cooperates, is defined here below as modulation area $A_m$, because the interaction between the front end portion 12a and the gasket 10 allows, in a conventional manner (see EP 1457400), the modulated communication between the front chamber 52 and the discharge chamber 43.

The braking system 100 according to the present invention comprises a bushing 15 fixedly connected, for example screwed, to the front end portion 12*a*, distal relative to the actuating rod 14, of the control piston 12. The bushing 15 is associated, by means of a counter-acting member 45, for example a spring, to the piston 41 of the master cylinder 40. Preferably, the bushing 15 is associated to a support washer 19 against which an end of the spring 45 abuts.

According to the present invention, the braking device 100 further comprises a gasket 16, for example an O-ring, associated to the inner surface 61 of the plunger 11 and adapted to cooperate with the bushing 15, more particularly with an outer surface 62 of the bushing 15, so as to isolate the region 47 interposed between the bushing 15 and the piston 41 of the master cylinder 40 from the discharge chamber 43.

Preferably, the gasket 16 is constrained between two washers 17*a*, 17*b*, of which the first washer 17*a* abuts against a shoulder 46 provided on the inner surface 61 of the plunger 11 and the second washer 17*b* abuts against a Seeger ring 18 associated with the inner surface 61 of the plunger 11.

By means of the configuration described above, the effective cross-sectional area of the bushing 15, i.e., the cross-sectional area enclosed by the gasket 16, is the area that counter-acts the pressure that is gradually building up, in a known manner, in the region 47 by means of the brake booster.

Advantageously, by using bushings of different size, i.e., with different effective cross-sectional areas that differ from the modulation area $A_m$, defined above, it will be possible to easily vary the boosting ratio of the braking system 100, as will be better illustrated below.

Figure 3:
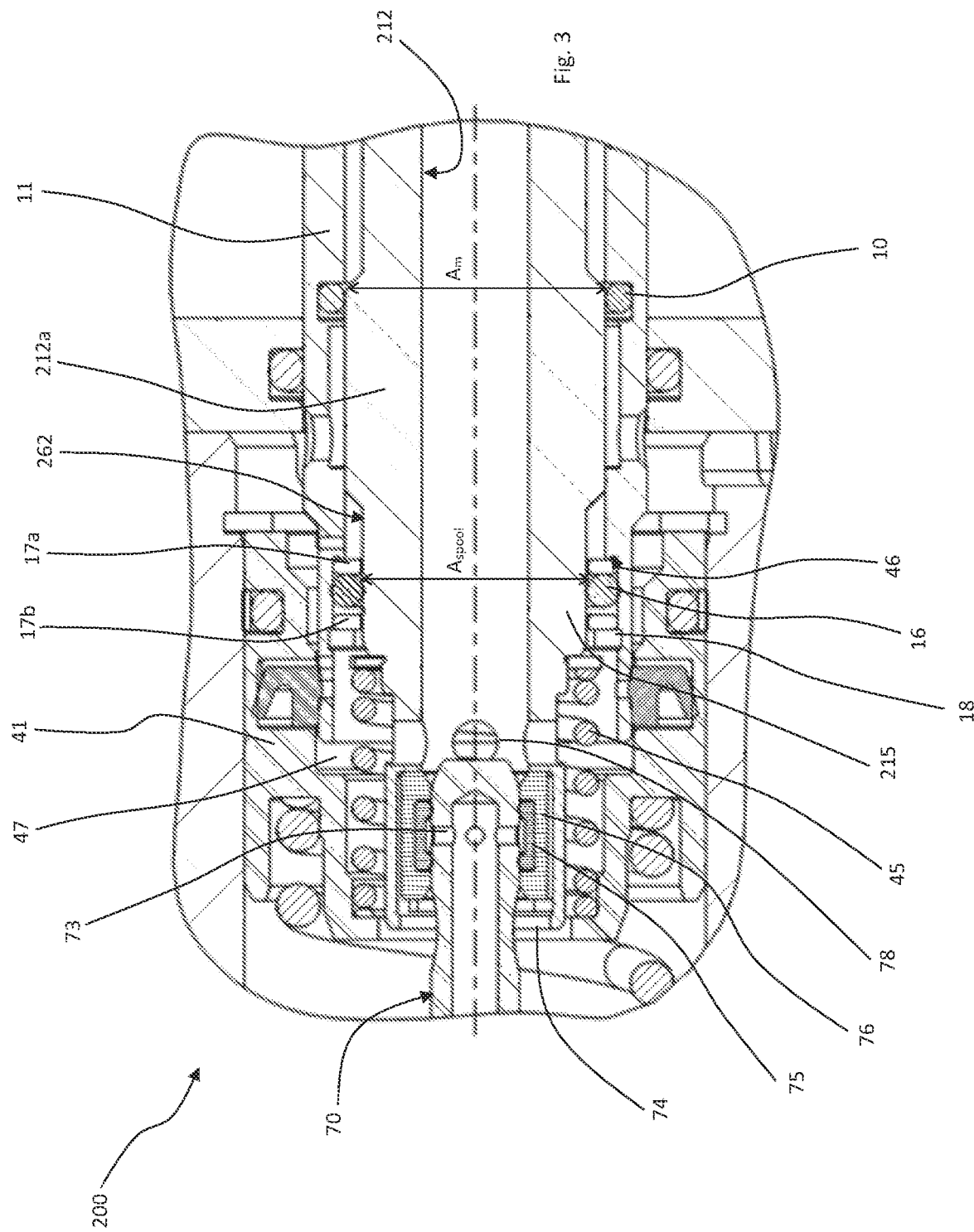
FIG. 3 spresent hows a view of a part of the hydraulic braking device according to a second embodiment of the present invention.

Referring to FIG. 3, a second embodiment of the braking device 200 according to the invention will be described below.

The braking device 200 is substantially identical to the one of the first embodiment and is shown in FIG. 3 only for the part containing elements differing from the first embodiment, whereas the same reference numerals used for the first embodiment are maintained for those elements that remain unchanged.

The braking device 200 comprises a control piston 212 in which a front end portion 212*a*, with which the gasket 10 cooperates, is followed by a thrust portion 215 associated, by means of a counter-acting member 45, for example a spring, with the piston 41 of the master cylinder 40. Therefore, unlike the first embodiment of the braking device 100, the braking device 200 does not comprise a bushing connected to its front end portion 212*a*.

Analogously to what has been described with reference to the first embodiment, the cross-sectional area of the front end portion 212*a* of the control piston 212 with which the gasket 10 cooperates is defined as modulation area $A_m$, because the interaction between the front end portion 212*a* and the gasket 10 allows, in a conventional manner (see EP 1457400), the modulated communication between the front chamber 52 and the discharge chamber 43.

According to the present invention, the braking device 200 further comprises a gasket 16, for example an O-ring, associated with the inner surface 61 of the plunger 11 and adapted to cooperate with the thrust portion 215, more particularly with an outer surface 262 of the thrust portion 215, so as to isolate the region 47 interposed between the thrust portion 215 and piston 41 of the master cylinder 40 from the discharge chamber 43.

As described in the first embodiment, the gasket 16 is constrained between two washers 17*a*, 17*b* associated with the inner surface 61 of the plunger 11; for example, the first washer 17*a* abuts against a shoulder 46 provided on the inner surface 61 of the plunger 11 and the second washer 17*b* abuts against a Seeger ring 18 associated with the inner surface 61 of the plunger 11.

By means of the configuration described above, the effective cross-sectional area of the thrust portion 215, i.e., the cross-sectional area enclosed by the gasket 16, is the area that counter-acts the pressure that is gradually building up, in a conventional manner, in the region 47 by means of the brake booster.

Advantageously, by using control pistons 212 with different thrust portions 215, i.e., with different effective cross-sectional areas that differ from the modulation area $A_m$ defined above, it will be possible to easily vary the boosting ratio of the braking system 200, as will be better illustrated below.

Referring to FIG. 4, a third embodiment of the braking device 300 according to the present invention is described below.

The braking device 300 is substantially identical to the one of the first embodiment; FIG. 4 shows only a part thereof and the same reference numerals used for the first embodiment are maintained for those elements that remain unchanged.

In the braking device 300, the gasket 16 is mounted in a ferrule 20 associated with the inner surface 61; for example, the ferrule 20 is tightly mounted, preferably with interference fit, between a shoulder 46 provided on the inner surface 61 of the plunger 11 and a Seeger ring 18 associated to the inner surface 61 of the plunger 11.

Analogously to what has been described with reference to the first embodiment, the effective cross-sectional area of the bushing 15, i.e., the cross-sectional area enclosed by the gasket 16, is the area that counter-acts the pressure that is gradually building up, in a known manner, in the region 47 by means of the brake booster.

Therefore, also in the third embodiment of the braking device 300 it is possible to use, advantageously, bushings of different size, i.e., with different effective cross-sectional areas, so as to easily vary the boosting ration, as will be better described below.

A further embodiment can also be provided, having a control piston comprising a thrust portion (and therefore having no bushing), as described in the second embodiment, and means for retaining the gasket cooperating with the thrust portion, said retaining means being similar to those described in the third embodiment, i.e. including a ferrule instead of washers.

Advantageously, by providing the ferrule 20 it is possible to use bushings 15 or control pistons with thrust portions 215 having effective cross-sectional areas that differ remarkably from the cross-sectional area delimited by the inner surface 61 of the plunger 11, because the ferrule 20 allows to easily compensate for such difference.

According to all the embodiments described above, the braking device 100, 200 or 300 is the first braking device of a pair of braking devices (substantially identical to each other) of a braking system (not shown) of an agricultural vehicle or the like. In such braking systems, each braking device is associated with a corresponding brake of a rear wheel of the agricultural vehicle in order to be able to act onto a single rear brake and effect the so-called "steer-bybraking". It is therefore necessary to balance the control pressures provided by the master cylinders of the pair of braking devices in order to ensure balanced braking, i.e., a braking having substantially the same intensity on both rear wheels, when the pedals of both braking devices are actuated. To this purpose, the braking devices are equipped with balancing devices.

The braking device 100, 200 or 300 according to the embodiments described herein includes a balancing device with a general structure, only briefly described below, corresponding to the one described in PCT Application No. WO 2017/013595, to which reference is made for a detailed description of the structure itself as well as of the operation thereof.

The balancing device 100, 200 or 300 comprises a stem 70 coaxial with the bushing 15 and/or the thrust portion 215 and fixed to the master cylinder 40, preferably at a front bottom 48 of the chamber 42 of the master cylinder 40. The stem 70, coaxial with the control piston 12 or 212, comprises an inner surface, in which a balancing channel 71 is provided, and an outer surface.

A first end of the balancing channel 71, proximal relative to the front bottom 48 of the chamber 42 of the master cylinder 40, is connected, through a hole 72, to a balancing channel (not shown) which in turn communicates with a first end of a balancing channel of the second braking device of the pair of braking devices.

A second end of the balancing channel 71, distal relative to the bottom of the chamber 42 of the master cylinder 40, ends with at least one radial hole 73, for example with two radial holes, within the bushing 15 or the thrust portion 215 having a suitable opening 74 adapted to receive the stem 70.

The radial holes 73 are closed by a usually closed balancing valve, comprising, for example, a gasket 75, preferably fitted on a case 76 mounted, preferably with clearance, in the bushing 15 or in the thrust portion 215.

According to the illustrated embodiments, the balancing valve opens when the bushing 15 or the thrust portion 215, upon actuation of the brake pedal, and after overcoming the pre-load of the spring 45, moves towards the front portion of the master cylinder 40, so that the gasket 75, sliding along the stem 70, opens the radial holes 73, thus communicating the balancing channel 71 with a recess 77 provided within the bushing 15 or the thrust portion 215, and therefore with the chamber 42 of the master cylinder 40, through a region 47 provided between the piston 41 of the master cylinder 40 and the bushing 15 or the thrust portion 215, and through at least one radial hole 78 provided in the bushing 15 or in the thrust portion 215.

Balancing between the control pressures existing in the chambers of the master cylinders of the two braking devices is therefore actuated mechanically after a certain stroke of the corresponding control pistons, i.e., of the corresponding brake pedals.

Although the descried embodiments comprise a balancing device of the kind described, further embodiments may be envisaged having a different balancing device or no balancing device. In such cases the bushing may be made, for instance, without the opening 74, adapted to receive the stem 70 of the balancing device, and without the corresponding gasket 75, without departing from the scope of the present invention.

The operation of the brake booster will be described in general terms below, with the aim of highlighting the effects of the present invention thereon.

As is conventional, the action of the brake booster 50 is triggered by the actuation of the brake pedal, upon which, as illustrated above, the front chamber 52 is isolated from the rear chamber 53 and is brought in modulated communication with the discharge chamber 43. This causes a pressure drop in the front chamber 52 and therefore a pressure difference between the front chamber 52 and the rear chamber 53, said drop causing the piston 51 of the brake booster 50 to advance towards the front portion of braking device 100, 200 or 300. The advancing of the piston 51 of the brake booster 50 causes in turn, by interacting with the gasket 44 in a known manner, establishment of a pressure in the region 47 interposed between the bushing 15 or the thrust portion 215 of the control piston 212 and the piston 41 of the master cylinder 40, said pressure causing advancing of the piston 41 of the master cylinder 40 and a pressure raise in the chamber 42 of the master cylinder 40, thus performing the brake boosting function.

The brake booster 50 according to the present invention is characterized by a boosting ratio $R_{ass}$, defined as the ratio between the boosting force $P_{ass}$, i.e., the force generated by the boosting system, and the incoming force, i.e. the force exerted by the brake pedal. In the brake boosters described in the above-cited European Patent Application No. EP 1457400 and PCT Application No. WO 2017/013595, such boosting ratio is:

$$R_{ass} = \frac{F_{ass}}{F_{in}} = \frac{p_{ass}(A_{ass} - A_{tuff})}{p_{out}A_{spool}} = \frac{p_{out}(A_{MC} - A_{spool})}{p_{out}A_{spool}} = \frac{(A_{MC} - A_{spool})}{A_{spool}}$$

where $p_{ass}$ is the pressure existing within the front chamber 52, $A_{ass}$ is the area of the rear bore 33, $A_{tuff}$ is the area of the plunger 11, $p_{out}$ is the pressure within the chamber 42 of the master cylinder 40 (control pressure), $A_{MC}$ is the effective cross-sectional area of the piston of the master cylinder, i.e., the area of the front bore 32. The above formula applies also to the braking device according to the present invention, with the difference that $A_{spool}$ is no longer the effective cross-sectional area of the control piston, but it is instead the effective cross-sectional area of the bushing 15 or the effective cross-sectional area of the thrust portion 215 of the control piston 212, which, upon their advancing towards the piston 41 of the master cylinder 40, counter-act the pressure that is gradually building up, in a known manner, in the region 47 by means of the brake booster.

Advantageously, according to the first embodiment of the present invention, it is possible to easily vary the boosting ratio by simply replacing the bushing 15 with another one having a different effective cross-sectional area and by replacing accordingly the O-ring 16, as well as the means (Seeger ring 18 and washers 17a, 17b or, alternatively, ferrule 20) fixing the gasket 16 to the plunger 11. This, indeed, makes it possible to vary the area $A_{spool}$ without having to replace the whole control piston 12 and the plunger 11.

Advantageously, according to the second embodiment of the present invention, it is possible to easily vary the boosting ratio by replacing the control piston 212 with another one having a thrust portion 215 with a different effective cross-sectional area and by replacing accordingly the O-ring 16, as well as the means (Seeger ring 18 and washers 17a, 17b or, alternatively, ferrule 20) fixing the gasket 16 to the plunger 11. This makes it possible to vary the area $A_{spool}$ while maintaining unchanged the size of the front end portion 212a (and consequently of the rear end portion) of the control piston 212 without having to replace the plunger 11.

In addition, according to the third embodiment of the present invention, if the difference between the cross-sectional area delimited by the inner surface 61 of the plunger 11 and the effective cross-sectional area of the bushing 15 or of the thrust portion 215 of the control piston 212 is excessive, use of the ferrule 20 associated with the O-ring 16 allows to easily compensate for such difference.

The invention claimed is:

1. A hydraulic braking device: comprising:
   a master cylinder, a piston of the master cylinder defining a chamber of the master cylinder, said chamber of the master cylinder being arranged to contain a pressurized fluid, wherein a control pressure transmitted to one or more vehicle brakes is generated in the chamber of the master cylinder;
   a brake booster, a piston of the brake booster defining a first and a second pressurized chamber of the brake booster,
   wherein under rest conditions of the braking device, the first and the second pressurized chambers are connected to each other, and
   wherein during braking, the connection of the first and the second pressurized chambers is interrupted; and
   a control piston driven by actuating a brake pedal, the control piston being mounted so as to be slidable in a plunger of the piston of the brake booster, wherein a first gasket is associated with the plunger and a second gasket is associated with the plunger, the control piston including a first end portion having a cross-sectional area and being arranged to cooperate with the first gasket associated with the plunger so as to establish, during braking, a modulated communication between the first pressurized chamber of the brake booster and a discharge chamber of the master cylinder;
   wherein, an effective cross-sectional area, which counteracts a pressure existing in a region between the piston of the master cylinder and the control piston, is different from the cross-sectional area of the first end portion of the control piston,
   one of:
   a bushing fixedly connected to the first end portion of the control piston, the bushing having an outer surface arranged to cooperate with the second gasket associated with the plunger, so that the effective cross-sectional area counter-acting the pressure existing in the region between the piston of the master cylinder and the control piston is an effective cross-sectional area of the bushing, and the effective cross-sectional area of the bushing has a different effective cross-sectional area than that of the cross-sectional area of the first end portion of the control piston, or
   a thrust portion, the thrust portion having an outer surface arranged to cooperate with the second gasket associated with the plunger, so that the effective cross-sectional area counter-acting the pressure existing in the region between the piston of the master cylinder and the control piston is an effective cross-sectional area of the thrust portion,
   wherein the second gasket is constrained between a first washer and a second washer that are associated with an inner surface of the plunger,
   wherein the first washer abuts against a shoulder provided on the inner surface of the plunger and the second washer abuts against a ring associated with the inner surface of the plunger.

2. The device according to claim 1, wherein the bushing is associated with a support washer arranged to serve as support for a counter-acting member interposed between the bushing and the piston of the master cylinder.

* * * * *